US011117817B2

(12) United States Patent
Staudt et al.

(10) Patent No.: US 11,117,817 B2
(45) Date of Patent: Sep. 14, 2021

(54) REMOVING METAL IONS FROM AQUEOUS SYSTEMS WITH AN ACTIVE LAYER MEMBRANE

(71) Applicant: DUPONT SAFETY & CONSTRUCTION, INC., Wilmington, DE (US)

(72) Inventors: Claudia Staudt, Shanghai (CN); Peter Berg, Greifenberg (DE); Martin Heijnen, Greifenberg (DE); Natalia Widjojo, Singapore (SG); Jia Le Low, Singapore (SG); Marc Rudolf Jung, Ludwigshafen (DE)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 137 days.

(21) Appl. No.: 16/477,368

(22) PCT Filed: Dec. 20, 2017

(86) PCT No.: PCT/EP2017/083871
§ 371 (c)(1),
(2) Date: Jul. 11, 2019

(87) PCT Pub. No.: WO2018/130394
PCT Pub. Date: Jul. 19, 2018

(65) Prior Publication Data
US 2019/0358593 A1  Nov. 28, 2019

(30) Foreign Application Priority Data

Jan. 12, 2017 (EP) .................................... 17151236
Sep. 6, 2017 (EP) .................................... 17189609

(51) Int. Cl.
C02F 1/44 (2006.01)
B01D 69/02 (2006.01)
B01D 69/08 (2006.01)
B01D 71/60 (2006.01)
B01D 71/68 (2006.01)
B01D 67/00 (2006.01)
B01D 69/12 (2006.01)
B01D 71/56 (2006.01)
B01D 61/14 (2006.01)
C02F 101/20 (2006.01)
C02F 103/08 (2006.01)

(52) U.S. Cl.
CPC .............. C02F 1/444 (2013.01); B01D 61/14 (2013.01); B01D 67/0006 (2013.01); B01D 69/02 (2013.01); B01D 69/08 (2013.01); B01D 69/125 (2013.01); B01D 71/60 (2013.01); B01D 71/68 (2013.01); B01D 2323/30 (2013.01); B01D 2325/022 (2013.01); *B01D 2325/34* (2013.01); *C02F 2101/20* (2013.01); *C02F 2103/08* (2013.01)

(58) Field of Classification Search
CPC ........ B01D 69/02; B01D 69/08; B01D 69/12; B01D 69/125; B01D 71/56; B01D 71/60; B01D 71/68; B01D 61/14; B01D 67/0006; B01D 2323/30; B01D 2325/022; B01D 2325/34; C02F 1/444; C02F 2101/20; C02F 2103/08
See application file for complete search history.

(56) References Cited

U.S. PATENT DOCUMENTS

| 4,277,344 A | 7/1981 | Cadotte |
| 8,697,834 B2 | 4/2014 | Schaub et al. |
| 2014/0163199 A1 | 6/2014 | Hueffer et al. |
| 2015/0367293 A1 | 12/2015 | Shih et al. |

FOREIGN PATENT DOCUMENTS

| JP | 3-72881 A | 3/1991 |
| WO | WO 2016/073565 A1 | 5/2016 |

OTHER PUBLICATIONS

International Search Report dated Mar. 5, 2018 in PCT/EP2017/083871 filed Dec. 20, 2017, 4 pages.
International Preliminary Report on Patentability dated Jul. 16, 2019 in PCT/EP2017/083871 filed Dec. 20, 2017, 9 pages.
Extended European Search Report dated Aug. 10, 2017 in Patent Application No. 17151236.1, 4 pages.
Wangxi Fang, et al., "Interfacially Polymerized Composite Nanofiltration Hollow Fiber Membranes for Low-Pressure Water Softening" Journal of Membrane Science, vol. 430, Mar. 2013, pp. 129-139.
Wangxi Fang, et al., "Mixed Polyamide-Based Composite Nanofiltration Hollow Fiber Membranes with Improved Low-Pressure Water Softening Capability" Journal of Membrane Science, vol. 468, Oct. 15, 2014, pp. 52-61.
Robert J. Petersen, "Composite Reverse Osmosis and Nanofiltration Membranes" Journal of Membrane Science, vol. 83, Issue 1, Aug. 12, 1993, pp. 81-150.

*Primary Examiner* — John Kim
(74) *Attorney, Agent, or Firm* — Kenneth Crimaldi

(57) ABSTRACT

A process for removing metal ions from aqueous systems is disclosed comprising the treatment of the aqueous system with a membrane M, wherein the membrane M has a molecular weight cut-off above 3,000 Da and comprises A.) a carrier membrane CM, wherein said carrier membrane CM has a porous structure wherein the average pore diameter on one surface is smaller than in the rest of the membrane, thus forming rejection layers R on one side of carrier membrane CM, and B.) an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM.

15 Claims, 1 Drawing Sheet

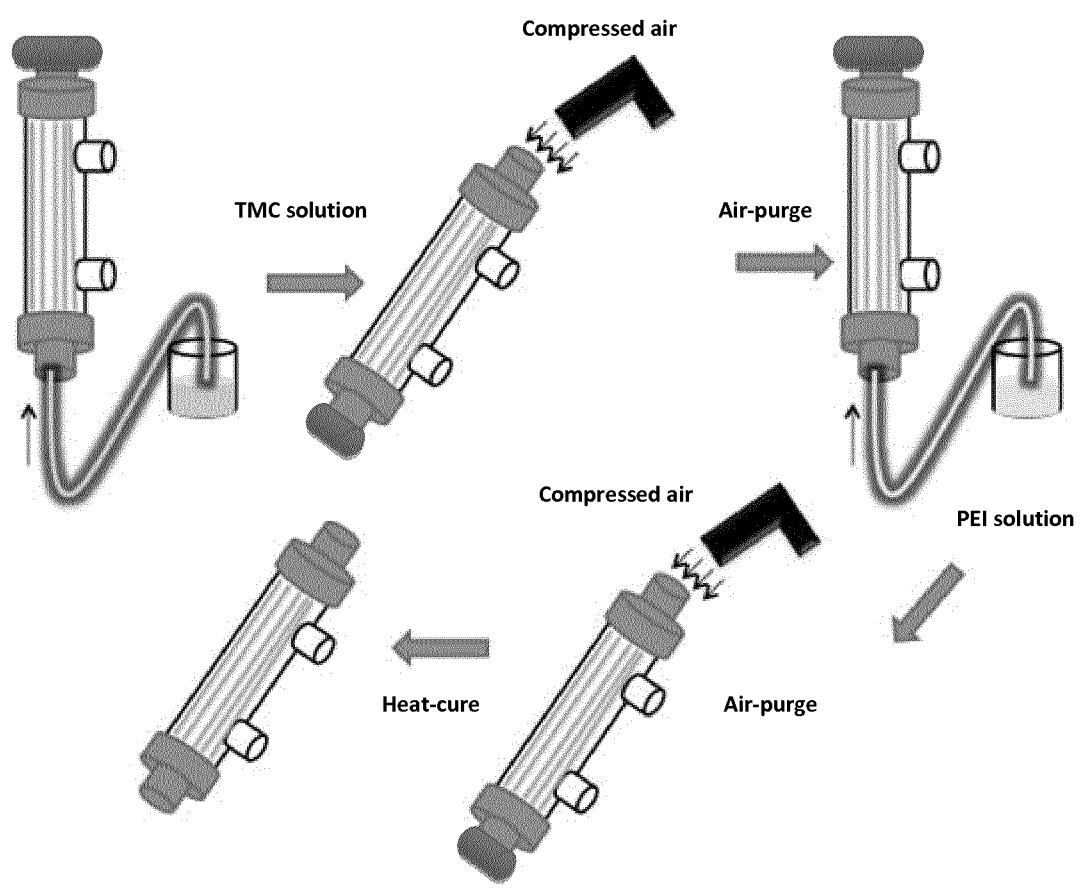

REMOVING METAL IONS FROM AQUEOUS SYSTEMS WITH AN ACTIVE LAYER MEMBRANE

BRIEF DESCRIPTION OF THE DRAWING

FIG. 1 depicts the inside-out coating method of active UF membranes, as described in Examples 1 to 18.

DESCRIPTION

The present invention is directed to a process for removing metal ions from aqueous systems is disclosed comprising the treatment of the aqueous system with a membrane M, wherein the membrane M has a molecular weight cut-off above 3,000 Da and comprises A.) a carrier membrane CM, wherein said carrier membrane CM has a porous structure wherein the average pore diameter on one surface is smaller than in the rest of the membrane, thus forming rejection layers R on one side of carrier membrane CM, and B.) an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM. The present invention is further directed to membranes M, comprising A.) a carrier membrane CM, wherein said carrier membrane CM has a porous structure wherein the average pore diameter on one surface is smaller than in the rest of the membrane, thus forming rejection layers R on one side of carrier membrane CM, and B.) an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM. The present invention is further directed to processes for making membranes M and to the use of membranes M for treating water.

Different types of membranes play an increasingly important role in many fields of technology. In particular, methods for treating water rely more and more on membrane technology. There is a need for membranes with improved separation characteristics. In particular, it is desirable to have membranes capable of removing metal ions from water.

R. J. Petersen, Composite reverse osmosis and nanofiltration membranes, J. Mem. Sci. 83 (1993) 81-150 discloses nanofiltration membranes prepared by coating using polyethyleneimine and trimesoyl chloride. U.S. Pat. No. 4,277,344 discloses interfacially synthesized reverse osmosis membranes.

It was therefore an objective of the present invention to provide membranes with good permeabilities and rejection performance that are capable of removing metal ions from aqueous systems.

These objectives have been solved by a process for removing metal ions from aqueous systems comprising the treatment of the aqueous system with a membrane M, wherein the membrane M has a molecular weight cut-off above 3,000 Da and comprises
A. a carrier membrane CM, wherein said carrier membrane CM has a porous structure wherein the average pore diameter on one surface is smaller than in the rest of the membrane, thus forming rejection layers R on one side of carrier membrane CM, and
B. an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM.

These objectives have been further solved by a process for removing metal ions from aqueous systems comprising the treatment of the aqueous system with a membrane M, wherein the membrane M has a molecular weight cut-off above 3,000 Da and comprises
A. a carrier membrane CM, wherein said carrier membrane CM has a porous structure wherein the average pore diameter on one surface is smaller than in the rest of the membrane, thus forming rejection layers R on one side of carrier membrane CM, and
B. an active layer A comprising at least one polymer P selected from linear or branched polyethyleneimine PEI, wherein said active layer A is located on the surfaces of the rejection layers R of carrier membrane CM and throughout the porous structure of carrier membrane CM.

These objectives have been solved by membranes M comprising
A. a carrier membrane CM, wherein said carrier membrane CM has a porous structure wherein the average pore diameter on one surface is smaller than in the rest of the membrane, thus forming rejection layers R on one side of carrier membrane CM, and
B. an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag, wherein said active layer A is located on the surfaces of the rejection layers R of carrier membrane CM and throughout the porous structure of carrier membrane CM, wherein the membrane M has preferably a molecular weight cut-off above 3,000 Da.

"Throughout the porous structure" in the context of this application shall mean that the active layer L has at least partly penetrated into the porous structures of the carrier membrane CM from the surface of carrier membrane CM where the rejection layer R is located.

In the context of this application a membrane shall be understood to be a thin, semipermeable structure capable of separating two fluids or separating molecular and/or ionic components or particles from a liquid. A membrane acts as a selective barrier, allowing some particles, substances or chemicals to pass through, while retaining others.

The treatment of the aqueous system with the membrane M is usually a filtration of the aqueous system. Methods for filtration are known to an expert.

Preferably, carrier membrane CM is a hollow fiber membrane having one or more channels with an inside with an inner surface and an outside with an outer surface and wherein rejection layer R is formed on the inside or on the outside of carrier membrane CM.

Preferably, carrier membranes CM comprise as its main component at least one polymer selected from polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphonyleneesulfone, or polyethersulfone, or mixtures thereof.

In particular, the carrier membrane CM comprises as its main component at least one polmyer selected from polysulfone, polyphenylenesulfone, polyethersulfone, or mixtures thereof.

The term "main component" with regard to the polymer component in a membrane usually means that the membrane comprises at least 50 wt %, preferably at least 80 wt %, and in particular at least 90 wt % of the respective polymer.

For example, carrier membranes CM can be ultrafiltration (UF) membranes or microfiltration (MF) membranes, wherein UF membranes are preferred. These membrane types are generally known in the art and are further described below.

Usually, the membrane M, such as the ultrafiltration membrane, has a molecular weight cut-off (MWCO) above 3,000 Da, preferably above 7,000 Da, and in particular above 10,000 Da.

The molecular weight cut-off may be determined with polyethyleneglycol solutions of known molar mass, e.g. as decribed in the experimental part.

UF membranes are normally suitable for removing suspended solid particles and solutes of high molecular weight, for example above 10,000 Da. In particular, UF membranes are normally suitable for removing bacteria and viruses.

UF membranes normally have an average pore diameter of 2 nm to 50 nm, preferably 5 to 40 nm, more preferably 5 to 20 nm.

In one embodiment, UF membranes comprise as the main component at least one polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, polyetherimide (PEI), Polyetheretherketone (PEEK), sulfonated polyetheretherketone (SPEEK), Poly(dimethylphenylene oxide) (PPO), Polycarbonate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/aliphatic or aliphatic polyamidimides, crosslinked polyimides or polyarylene ether, polysulfone, polyphenylenesulfone, or polyethersulfone, or mixtures thereof.

In another embodiment of the invention, UF membranes comprise as the main component at least one polysulfone, polyphenylenesulfone and/or polyethersulfone. "Polysulfones", "polyethersulfones" and "polyphenylenesulfones" shall include the respective polymers that comprise sulfonic acid and/or salts of sulfonic acid at some of the aromatic moieties.

In one embodiment, UF membranes comprise as the main component or as an additive at least one partly sulfonated polysulfone, partly sulfonated polyphenylenesulfone and/or partly sulfonated polyethersulfone. In one embodiment, UF membranes comprise as the main component or as an additive at least one partly sulfonated polyphenylenesulfone.

"Arylene ethers", "Polysulfones", "polyethersulfones" and "polyphenylenesulfones" shall include block polymers that comprise blocks of the respective arylene ethers, Polysulfones, polyethersulfones or polyphenylenesulfones as well as other polymer blocks.

In one embodiment, UF membranes comprise as the main component or as an additive at least one block copolymer of at least one arylene ether and at least one polyalkylene oxide. In one embodiment, UF membranes comprise as the main component or as an additive at least one block copolymer of at least one polysulfone or polyethersulfone and at least one polyalkylene oxide like polyethylene oxide, In one embodiment, UF membranes comprise further additives like polyvinyl pyrrolidones or polyalkylene oxides like polyethylene oxides.

In a preferred embodiment, UF membranes comprise as major components polysulfones, polyphenylenesulfone or polyethersulfone in combination with additives like polyvinylpyrrolidone.

In one preferred embodiment, UF membranes comprise 99.9 to 50% by weight of a combination of polyethersulfone and 0.1 to 50% by weight of polyvinylpyrrolidone. In another embodiment UF membranes comprise 95 to 80% by weight of polyethersulfone and 5 to 20% by weight of polyvinylpyrrolidone.

In one embodiment of the invention, UF membranes are present as spiral wound membranes, as pillows or flat sheet membranes. In another embodiment of the invention, UF membranes are present as tubular membranes. In another embodiment of the invention, UF membranes are present as hollow fiber membranes or capillaries. In yet another embodiment of the invention, UF membranes are present as single bore hollow fiber membranes. In yet another embodiment of the invention, UF membranes are present as multibore hollow fiber membranes.

Multiple channel membranes, also referred to as multibore membranes, comprise more than one longitudinal channels also referred to simply as "channels". In a preferred embodiment, the number of channels is typically 2 to 19. In one embodiment, multiple channel membranes comprise two or three channels. In another embodiment, multiple channel membranes comprise 5 to 9 channels. In one preferred embodiment, multiple channel membranes comprise seven channels. In another embodiment the number of channels is 20 to 100.

The shape of such channels, also referred to as "bores", may vary. In one embodiment, such channels have an essentially circular diameter. In another embodiment, such channels have an essentially ellipsoid diameter. In yet another embodiment, channels have an essentially rectangular diameter. In some cases, the actual form of such channels may deviate from the idealized circular, ellipsoid or rectangular form.

Normally, such channels have a diameter (for essentially circular diameters), smaller diameter (for essentially ellipsoid diameters) or smaller feed size (for essentially rectangular diameters) of 0.05 mm to 3 mm, preferably 0.5 to 2 mm, more preferably 0.9 to 1.5 mm. In another preferred embodiment, such channels have a diameter (for essentially circular diameters), smaller diameter (for essentially ellipsoid diameters) or smaller feed size (for essentially rectangular diameters) in the range from 0.2 to 0.9 mm.

For channels with an essentially rectangular shape, these channels can be arranged in a row. For channels with an essentially circular shape, these channels are in a preferred embodiment arranged such that a central channel is surrounded by the other channels. In one preferred embodiment, a membrane comprises one central channel and for example four, six or 18 further channels arranged cyclically around the central channel. The wall thickness in such multiple channel membranes is normally from 0.02 to 1 mm at the thinnest position, preferably 30 to 500 µm, more preferably 100 to 300 µm. Normally, the membranes according to the invention and carrier membranes have an essentially circular, ellipsoid or rectangular diameter. Preferably, membranes according to the invention are essentially circular.

In one preferred embodiment, membranes according to the invention have a diameter (for essentially circular diameters), smaller diameter (for essentially ellipsoid diameters) or smaller feed size (for essentially rectangular diameters) of 2 to 10 mm, preferably 3 to 8 mm, more preferably 4 to 6 mm. In another preferred embodiment, membranes according to the invention have a diameter (for essentially circular diameters), smaller diameter (for essentially ellipsoid diameters) or smaller feed size (for essentially rectangular diameters) of 2 to 4 mm.

In one embodiment the rejection layer is located on the inside of each channel of said multiple channel membrane.

In one embodiment multibore membranes are designed with pore sizes between 0.2 and 0.01 µm. In such embodiments the inner diameter of the capillaries can lie between 0.1 and 8 mm, preferably between 0.5 and 4 mm and particularly preferably between 0.9 and 1.5 mm. The outer diameter of the multibore membrane can for example lie between 1 and 26 mm, preferred 2.3 and 14 mm and particularly preferred between 3.6 and 6 mm. Furthermore, the multibore membrane can contain 2 to 94, preferably 3 to 19 and particularly preferred between 3 and 14 channels. Often multibore membranes contain seven channels. The permeability range can for example lie between 100 and 10000 L/m² hbar, preferably between 300 and 2000 L/m² hbar.

Typically multibore membranes of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol.

MF membranes are normally suitable for removing particles with a particle size of 0.1 µm and above. Microfiltration systems are usually designed to remove suspended solids down to 0.1 micrometers in size, in a feed solution with up to 2-3% in concentration.

MF membranes normally have an average pore diameter of 0.05 µm to 10 µm, preferably 1.0 µm to 5 µm.

Microfiltration can use a pressurized system but it does not need to include pressure.

MF membranes can be capillaries, hollow fibers, flat sheet, tubular, spiral wound, pillows, hollow fine fiber or track etched. They are porous and allow water, monovalent species (Na+, Cl—), dissolved organic matter, small colloids and viruses through but retain particles, sediment, algae or large bacteria.

In one embodiment, MF membranes comprise as the main component at least polyamide (PA), polyvinylalcohol (PVA), Cellulose Acetate (CA), Cellulose Triacetate (CTA), CA-triacetate blend, Cellulose ester, Cellulose Nitrate, regenerated Cellulose, aromatic, aromatic/aliphatic or aliphatic Polyamide, aromatic, aromatic/aliphatic or aliphatic Polyimide, Polybenzimidazole (PBI), Polybenzimidazolone (PBIL), Polyacrylonitrile (PAN), PAN-poly(vinyl chloride) copolymer (PAN-PVC), PAN-methallyl sulfonate copolymer, polyetherimide (PEI), Polyetheretherketone (PEEK), sulfonated polyetheretherketone (SPEEK), Poly(dimethylphenylene oxide) (PPO), Polycarbo-nate, Polyester, Polytetrafluroethylene PTFE, Poly(vinylidene fluoride) (PVDF), Polypropylene (PP), Polyelectrolyte complexes, Poly(methyl methacrylate) PMMA, Polydimethylsiloxane (PDMS), aromatic, aromatic/aliphatic or aliphatic polyimide urethanes, aromatic, aromatic/ali-phatic or aliphatic polyamidimides, crosslinked polyimides or polyarylene ether, polysulfone, polyphenylenesulfone or polyethersulfone, or mixtures thereof. In another embodiment of the invention, MF membranes comprise as the main component at least one polysulfone, polyphenylenesulfone and/or polyethersulfone.

In one embodiment, MF membranes comprise as the main component at least one partly sulfonated polysulfone, partly sulfonated polyphenylenesulfone and/or partly sulfonated polyethersulfone. In one embodiment, MF membranes comprise as the main component at least one partly sulfonated polyphenylenesulfone.

In one embodiment, MF membranes comprise as the main component or as an additive at least one block copolymer of at least one arylene ether and at least one polyalkylene oxide. In one embodiment, MF membranes comprise as the main component or as an additive at least one block copolymer of at least one polysulfone or polyethersulfone and at least one polyalkylene oxide like polyethylene oxide.

Membranes suitable as carrier membranes CM are preferably hollow fiber membranes. Carrier membranes CM can have one or more channels with an inside and with an outside. Carrier hollow fiber membranes CM have an inner surface on the inside and an outer surface on the outside.

Hollow fiber membranes having more than one channel are also referred to a multibore membranes or multichannel or multiple channel membranes.

Multiple channel membranes, comprise more than one longitudinal channels also referred to simply as "channels". In a preferred embodiment, the number of channels is typically 2 to 19. In one embodiment, multiple channel membranes comprise two or three channels. In another embodiment, multiple channel membranes comprise 5 to 9 channels. In one preferred embodiment, multiple channel membranes comprise seven channels. In another embodiment the number of channels is 20 to 100.

The shape of such channels, also referred to as "bores", may vary. In one embodiment, such channels have an essentially circular diameter. In another embodiment, such channels have an essentially ellipsoid diameter. In yet another embodiment, channels have an essentially rectangular diameter. In some cases, the actual form of such channels may deviate from the idealized circular, ellipsoid or rectangular form.

Normally, such channels have a diameter (for essentially circular diameters), smaller diameter (for essentially ellipsoid diameters) or smaller feed size (for essentially rectangular diameters) of 0.05 mm to 3 mm, preferably 0.5 to 2 mm, more preferably 0.9 to 1.5 mm. In another preferred embodiment, such channels have a diameter (for essentially circular diameters), smaller diameter (for essentially ellipsoid diameters) or smaller feed size (for essentially rectangular diameters) in the range from 0.2 to 0.9 mm. For channels with an essentially rectangular shape, these channels can be arranged in a row. For channels with an essentially circular shape, these channels are in a preferred embodiment arranged such that a central channel is surrounded by the other channels. In one preferred embodiment, a membrane comprises one central channel and for example four, six or 18 further channels arranged cyclically around the central channel.

The wall thickness in such multiple channel membranes is normally from 0.02 to 1 mm at the thinnest position, preferably 30 to 500 µm, more preferably 100 to 300 µm.

Normally, the hollow fiber membranes M and carrier membranes CM have an essentially circular, ellipsoid or rectangular diameter. Preferably, carrier membranes CM are essentially circular. In one preferred embodiment, carrier membranes CM have a diameter (for essentially circular diameters), smaller diameter (for essentially ellipsoid diameters) or smaller feed size (for essentially rectangular diameters) of 2 to 10 mm, preferably 3 to 8 mm, more preferably 4 to 6 mm. In another preferred embodiment, carrier membranes CM have a diameter (for essentially circular diameters), smaller diameter (for essentially ellipsoid diameters) or smaller feed size (for essentially rectangular diameters) of 2 to 4 mm.

In one embodiment the rejection layer R is located on the inside of each channel of said multiple channel membrane.

In one embodiment the rejection layer R is located on the outside of said multiple channel membrane.

In one embodiment multibore membranes are designed with pore sizes in the rejection layer R between 0.2 and 0.01 µm. In such embodiments the inner diameter of the capillaries can lie between 0.1 and 8 mm, preferably between 0.5 and 4 mm and particularly preferably between 0.9 and 1.5 mm. The outer diameter of the multibore membrane can for example lie between 1 and 26 mm, preferred 2.3 and 14 mm and particularly preferred between 3.6 and 6 mm. Furthermore, the multibore membrane can contain 2 to 94, preferably 3 to 19 and particularly preferred between 3 and 14 channels. Often multibore membranes contain seven channels. The permeability range can for example lie between 100 and 10000 L/m² hbar, preferably between 300 and 2000 L/m² hbar.

Typically multibore membranes CM of the type described above are manufactured by extruding a polymer, which forms a semi-permeable membrane after coagulation through an extrusion nozzle with several hollow needles. A coagulating liquid is injected through the hollow needles into the extruded polymer during extrusion, so that parallel continuous channels extending in extrusion direction are formed in the extruded polymer. Preferably the pore size on an outer surface of the extruded membrane is controlled by bringing the outer surface after leaving the extrusion nozzle in contact with a mild coagulation agent such that the shape is fixed without active layer on the outer surface and subsequently the membrane is brought into contact with a strong coagulation agent. As a result a membrane can be obtained that has an active layer inside the channels and an outer surface, which exhibits no or hardly any resistance against liquid flow. Herein suitable coagulation agents include solvents and/or non-solvents. The strength of the coagulations may be adjusted by the combination and ratio of non-solvent/solvent. Coagulation solvents are known to the person skilled in the art and can be adjusted by routine experiments. An example for a solvent based coagulation agent is N-methylpyrrolidone. Non-solvent based coagulation agents are for instance water, iso-propanol and propylene glycol.

Membranes M comprise an active layer A comprising at least one polymer P comprising a plurality of functional groups G capable of forming stable complexes with metal ions selected from Ca, Mg, Al, Cu, Ni, Pb, Zn, Sb, Co, Cr, Cd, Hg and/or Ag. Said active layer A is located on the surfaces of the rejection layers R of carrier membrane CM and throughout the porous structure of carrier membrane CM.

"Stable complexes" in this context shall mean that they bind at least one of the respective metal ions at room temperature at a pH of 4 to 8 in water.

Suitable functional groups G capable of forming stable complexes with metal ions include primary amino groups, secondary amino groups, carboxylic acid salts, sulfonic acid salts, hydroxyl groups.

In one embodiment, active layer A is obtained from at least one polymer P that has optionally been crosslinked with at least one crosslinker V, wherein said polymer P is selected from linear or branched polyethyleneimine PEI, polyalkylenepolyamine, thiol-based polyethylenimine PEI, melamine based polyamines, polyetheramine, polyvinylamine, polyamidoamine, quarternary amine based polymers like Polydiallyldimethylammonium chloride (polyDADMAC), polyacrylic acid or salts thereof, polydiallyl-dimethyl-ammonium chloride, humic substances, carboxyl methyl cellulose, copolymers of acrylic acid and other ethylenically unsaturated compounds like maleic acid.

In another form a suitable polymer P that has optionally been crosslinked with at least one crosslinker V, is selected from linear or branched polyethyleneimine PEI, polyalkylenepolyamine, thiol-based polyethylenimine PEI, melamine based polyamines, polyetheramine, polyvinylamine, polyamidoamine, quarternary amine based polymers like Polydiallyldimethylammonium chloride (polyDADMAC), polyacrylic acid or salts thereof, polydiallyl-dimethyl-ammonium chloride, humic substances, carboxyl methyl cellulose, copolymers of acrylic acid other ethylenically unsaturated compounds like maleic acid. In a preferred form the polymer P that has optionally been crosslinked with at least one crosslinker V, is selected from linear or branched polyethyleneimine PEI.

In another form membranes M comprise the active layer A comprising at least one polymer P. Preferably, the membranes M comprise the active layer A comprising at least one polymer P selected from linear or branched polyethyleneimine PEI.

Crosslinker V comprises one or more functional groups capable of reacting with functional groups present in polymer P under formation of covalent bonds. In one embodiment crosslinker V comprises more than one functional groups capable of reacting with functional groups present in polymer P under formation of covalent bonds. In one embodiment crosslinker V comprises two or more functional groups capable of reacting with functional groups present in polymer P under formation of covalent bonds.

Preferebly, crosslinker V comprises three or more functional groups capable of reacting with functional groups present in polymer P under formation of covalent bonds. The term "capable of reacting with functional groups present in polymer P" shall be understood to mean that such crosslinkers V react with functional groups present in polymer P under conditions as they are applied for preparing active layer A under the formation of an atomic (covalent) bond.

In one embodiment, active layer A is obtained from at least one crosslinker V and at least one polyethyleneimine PEI. In this case crosslinker V comprises functional groups F capable of reacting with primary or secondary amino groups.

The term "capable of reacting with amino groups" shall be understood to mean that such functional groups F react with amino groups under conditions as they are applied for preparing active layer A under the formation of an atomic bond between said functional groups capable of reacting with amino groups and said amino groups.

In another form the crosslinker V comprises functional groups F which are acyl groups. Examples of functional groups F include acyl halide groups like acyl chloride, ester groups and carboxylic acid anhydride groups, aldehydes and isocyanates.

Preferably crosslinker V comprises three functional groups F per molecule. In one embodiment crosslinker V comprises more than three functional groups F per molecule. In one embodiment crosslinker V comprises four functional groups F per molecule.

Preferred crosslinkers V include trimesoylchloride, phthaloyl chloride (1,2-benzenedicarbonyl chloride), isophthaloyl chloride (1,3-benzenedicarbonyl chloride), terephthaloyl chloride (TCL, 1,4-benzenedicarbonyl chloride), mm-Biphenyl tetraacyl chloride (mm-BTEC), om-Biphenyl tetraacyl chloride (om-BTEC), op-Biphenyl tetraacyl chloride (op-BTEC), 5-chloroformyloxy-isophthaloyl chloride (CFIC), cyanuric chloride glutaryl chloride, hexafluoroglutaryl chloride, glutaraldehyde, formaldehyde, acetalde-hyde, propionaldehyde, butyraldehyde, benzaldehyde, glucose, imidazolate-2-carboxyaldehyde, iso-phthalaldehyde, orthophthaldialdehyde and tere-phthalaldehyde.

Polyethyleneimines PEI are polymers with repeating units composed of an amine group and two carbon aliphatic $CH_2CH_2$ spacer. Linear polyethyleneimines PEI contain all secondary amines (with the exception of the terminal positions), in contrast to branched polyethyleneimines PEIwhich contain primary, secondary and tertiary amino groups. Branched Polyethyleneimines PEI can in certain embodiments be in a hyper branched or dendrimeric form that is entirely branched.

The composition of polyethyleneimines PEI can in one embodiment be expressed by the following general molecular formula:

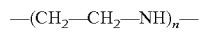

—$(CH_2—CH_2—NH)_n$—

With $10<n<10^5$.

Suitable polyethyleneimines PEI can be linear, branched or dendrimeric. Preferably, polyethyleneimines PEI is branched. Suitable polyethyleneimines PEI are for example available from BASF under the trade name Lupasol®. Branched polyethyleneimines PEI can be prepared by ring opening polymerization of aziridine. In one embodiment, polyethyleneimines PEI is prepared as disclosed in US 2014/163199 in [0014] to [0031]. In one embodiment, polyethyleneimines PEI is prepared as disclosed in U.S. Pat. No. 8,697,834 col 2, ln 53 to col 9 ln 26.

Polyethyleneimine PEI normally have an average molecular weight Mw of 500 to 1,000,000 g/mol (all Mw of PEI given herein are determined by GPC at pH 4.5; solvent THF, Mw determined by comparison over polystyrene standard). In one embodiment, polyethyleneimines PEI have an average molecular weight Mw of 500 to 1500. In one embodiment, polyethyleneimines PEI have an average molecular weight Mw of 1501 to 50,000. In one embodiment, polyethyleneimines PEI have an average molecular weight Mw of 50,001 to 1,000,000. Preferably, polyethyleneimines PEI have a molecular weight Mw of 600 to 1000, more preferably 700 to 900. In one embodiment polyethyleneimines PEI have a molecular weight Mw of 800 to 1000. In one embodiment polyethyleneimines PEI have a molecular weight Mw of between 400 and 10,000 Da.

Polyethyleneimines PEI normally have a viscosity of more than 3000 (water content 1% according to DIN 53715, K. Fischer; concentration 99% according to ISO 3251; viscosities herein are according to Brookfield, ISO 2555 and given in [mPa s]). In one embodiment, polyethyleneimines PEI have a viscosity of 3000 to 10,000, preferably 4000 to 9000 (water content 1% according to DIN 53715, K. Fischer; concentration 99% according to ISO 3251). In one embodiment, polyethyleneimines PEI have a viscosity of 10,001 to 100,000 (water content 1% according to DIN 53715, K. Fischer; concentration 99% according to ISO 3251). In one embodiment, polyethyleneimine PEI have viscosity higher than 100,000 or 200,000 (water content 1% according to DIN 53715, K. Fischer; concentration 99% according to ISO 3251). Preferably, polyethyleneimines PEI have a viscosity of 3000 to 7000, more preferably 4000 to 6000 (water content 1% according to DIN 53715, K. Fischer; concentration 99% according to ISO 3251). In one embodiment, polyethyleneimines PEI have a viscosity of 100 to 500, preferably 200 to 450 (water content 50% according to DIN 53715, K. Fischer; concentration 50% according to ISO 3251). In one embodiment, polyethyleneimines PEI have a viscosity of 501 to 15,000 (water content 50% according to DIN 53715, K. Fischer; concentration 50% according to ISO 3251). In one embodiment, polyethyleneimines PEI have viscosity higher than 15,001 (water content 50% according to DIN 53715, K. Fischer; concentration 50% according to ISO 3251). In one embodiment, polyethyleneimines PEI have viscosity from 15,001 (water content 50% according to DIN 53715, K. Fischer; concentration 50% according to ISO 3251) to 800 (water content 76% according to DIN 53715, K. Fischer; concentration 24% according to ISO 3251). Preferably, polyethyleneimines PEI has a viscosity of 200 to 450 (water content 50% according to DIN 53715, K. Fischer; concentration 50% according to ISO 3251).

Active layer A can be located on the inner surfaces or on the outer surface of carrier membranes CM. In one embodiment, active layer A is located on the inner surfaces of carrier membranes CM. In one embodiment, active layer A is located on the outer surface of carrier membranes CM.

In one embodiment, active layer A is prepared by preparing the reaction product of at least one crosslinker V and at least one polymer P, wherein said crosslinker V comprises functional groups F capable of reacting with functional groups present in polymer P, and applying said readily prepared reaction product onto the surface of carrier membrane CM. This can for example be done by applying a solution of said reaction product onto the surface of carrier membrane CM and removing the solvent.

In one embodiment, active layer A is prepared by preparing the reaction product of at least one crosslinker V and at least one polyethyleneimine PEI, wherein said crosslinker V comprises functional groups F capable of reacting with amino groups, and applying said readily prepared reaction product onto the surface of carrier membrane CM. This can for example be done by applying a solution of said reaction product onto the surface of carrier membrane CM and removing the solvent. In one embodiment, active layer A is prepared in situ on the surface of carrier membrane CM. This can for example be done by first applying crosslinker V onto the surface and bringing it in contact with a solution of polymer P in a separate step. In a preferred embodiment, active layer A is prepared in situ on the surface of carrier membrane CM. This can for example be done by first applying crosslinker V onto the surface and bringing it in contact with a solution of polyethyleneimine PEI in a separate step. In a another embodiment, active layer A is prepared in situ on the surface of carrier membrane CM by first applying a solution of polyethyleneimine PEI onto the surface and bringing it in contact with crosslinker V in a separate step.

Another aspect of the invention are processes for making membranes M.

Processes for making membranes M comprise the following steps:
a) Providing a carrier membrane CM wherein said carrier membrane CM is a hollow fiber membrane having one or more channels with an inside with an inner surface and an outside with an outer surface, wherein said carrier membrane has a porous structure wherein the average pore diameter on the one surface is smaller than in the rest of the membrane, thus forming rejection layers R on the inside or on the outside of carrier membrane CM,
b) Optionally applying a solution S1 comprising at least one crosslinker V and at least one solvent SV to the surfaces of carrier membrane CM where the rejection layer R is located,
c) Removing said at least one solvent SV at least partially from carrier membrane CM such that crosslinker V remains at least partially on the surface and/or in the pore structure of carrier membrane CM,
d) Applying a solution S2 comprising at least one polymer P and at least one solvent SP to the surfaces of carrier membrane CM where the rejection layer R is located,
e) Removing said at least one solvent SP from carrier membrane CM,
f) Optionally curing active layer A at a temperature from 25 to 100° C.

In case step b) is not carried out, step c) is also not carried out. In one embodiment, steps a) to e) are carried out in the order given above. In one embodiment, steps b) and c), if applicable, are carried after steps d) and e). In one embodiment, step f) is carried prior and/or during step e). In one embodiment step f) is carried out after step e).

Preferred components of processes according to the invention are the same as described above for membranes M.

Preferred solvents SV include alkanes like pentane, hexane, heptane, dodecane, octane and isoparaffin fluids.

Step b) is normally carried out at temperatures from 0° C. to 50° C., preferably between 15° C. to 35° C. In one embodiment, step b) is carried out at atmospheric pressure such that the surface of carrier membrane CM where the rejection layer R is located is brought into contact with solution S1. In one embodiment, a pressure between atmospheric pressure and 5 bar, preferably 1.1 to 2 bar is applied in step b) to push solution S1 through the carrier membrane CM and to at least partly penetrate the pore structure of carrier membrane CM starting from the surface where the rejection layer r is located.

In one embodiment, a vacuum between atmospheric pressure and 0.1 bar, preferably 0.95 to 0.5 bar is applied in step b) to suck solution S1 through the carrier membrane CM.

Removing of Solvent SV in step c) is carried out such that solvent SV is at least partly removed from the surface of carrier membrane CM and that crosslinker V remains at least partly present on the surface of carrier membrane CM, for example by using air blowing/pressurized air between 1 to 20 mins, preferably 1 to 10 mins. Preferably, removing of Solvent SV in step c) is carried out such that solvent SV is completely removed from the surface of carrier membrane CM and that crosslinker V remains at least partly present on the surface of carrier membrane CM by using air blowing/pressurized air between 1 to 20 mins, preferably 1 to 10 mins.

Preferred solvents for solvent SP include water and alcohols like methanol, ethanol, n/i-propanol, n/i/sec-butanol or mixtures thereof. Preferably solvent SP is water. In one embodiment, solution S2 further comprises additives like surfactants and/or triethanol-amine.

Step d) is normally carried out at temperatures from 0° C. to 50° C., preferably between 15° C. to 35° C. In one embodiment, step d) is carried out at atmospheric pressure such that the surface of carrier membrane CM is brought into contact with solution S2. In one embodiment, a pressure between atmospheric pressure and 5 bar, preferably 1.1 to 2 bar is applied in step d) to push solution S2 through the carrier membrane CM. In one embodiment, a vacuum between atmospheric pressure and 0.1 bar, preferably 0.95 to 0.5 bar is applied in step d) to suck solution S2 through the carrier membrane CM.

Removing of Solvent SP in step e) is carried out such that solvent SP is at least partly removed from the surface of carrier membrane CM and that polyethyleneimine PEI remains at least partly present on the surface of carrier membrane CM. Preferably, removing of Solvent SP in step e) is carried out such that solvent SP is completely removed from the surface of carrier membrane CM and that polyethyleneimine PEI remains at least partly present on the surface of carrier membrane CM.

Step e) can for example be carried out by applying elevated temperatures from 30 to 150° C., preferably 50 to 120° C. and/or vacuum below atmospheric pressure. Preferably, step e) is carried out by applying elevated temperatures from 30 to 150° C., preferably 50 to 120° C. and/or applying pressurized gas like pressurized air, nitrogen or argon. Hereby solvent SV evaporates, while polyethyleneimine PEI remains at least partly on the surface of carrier membrane CM.

To remove residuals of polyethyleneimine PEI that remains unreacted after steps a) to f), it is possible to rinse membrane M with a solvent capable of dissolving polyethyleneimine PEI like water.

In one embodiment, processes for making membranes M comprise the following steps:

a) Providing a carrier membrane CM wherein said carrier membrane CM is a hollow fiber membrane having one or more channels with an inside with an inner surface and an outside with an outer surface, wherein said carrier membrane has a porous structure wherein the average pore diameter on the one surface is smaller than in the rest of the membrane, thus forming rejection layers R on the inside or on the outside of carrier membrane CM,
b) applying a solution S1 comprising at least one crosslinker V and at least one solvent SV to the surfaces of carrier membrane CM where the rejection layer R is located,
c) Removing said at least one solvent SV at least partially from carrier membrane CM such that crosslinker V remains at least partially on the surface and/or in the pore structure of carrier membrane CM,
d) Applying a solution S2 comprising at least one polyethyleneimine PEI and at least one solvent SP to the surfaces of carrier membrane CM where the rejection layer R is located,
e) Removing said at least one solvent SP from carrier membrane CM,
f) Optionally curing active layer A at a temperature from 40 to 100° C.

In one embodiment, processes for making membranes M comprise the following steps:
a) Providing a carrier membrane CM wherein said carrier membrane CM is a hollow fiber membrane having one or more channels with an inside with an inner surface and an outside with an outer surface, wherein said carrier membrane has a porous structure wherein the average pore diameter on the one surface is smaller than in the rest of the membrane, thus forming rejection layers R on the inside or on the outside of carrier membrane CM,
b) Applying a solution S1 comprising at least one crosslinker V and at least one solvent SV to the surfaces of carrier membrane CM where the rejection layer R is located, rejection layer R being located on the lumen side,
c) Removing said at least one solvent SV at least partially from carrier membrane CM such that crosslinker V remains at least partially on the surface and/or in the pore structure of carrier membrane CM,
d) Applying a solution S2 comprising at least one polyethyleneimine PEI and at least one solvent SP to carrier membrane CM,
e) Removing said at least one solvent SP from carrier membrane CM,
f) Optionally curing active layer A at a temperature from 40 to 100° C.

Membranes M are easy and economical to make and allow for the efficient treatment of water or aqueous systems. Membranes M have excellent separation characteristics, for example with respect to the pure water permeability and the molecular weight cut-off. Furthermore, membranes according to the invention have very good dimensional stabilities, high heat distortion resistance, good mechanical properties and biocompatibility. They can be processed and handled at high temperatures, enabling the manufacture of membranes and membrane modules that are exposed to high temperatures and are for example subjected to disinfection using steam, water vapor or higher temperatures, for example above 100° C. of above 125° C. Membranes according to invention show excellent properties with respect to the decrease of flux through a membrane over time and their fouling and biofouling properties. Membranes according to the invention are easy and economical to make. Membranes according to the invention have a long lifetime.

Membranes M are especially suitable for the treatment of industrial waste water, especially mining water, waste water from oil wells or power plants, municipal waste water, sea water, brackish water, fluvial water, surface water or drinking water. The aqueous system is industrial waste water, municipal waste water, sea water, brackish water, fluvial water, surface water, drinking water, mining water, waste water from oil wells or power plants.

In particular, membranes M are useful for removing metal ions from water or aqueous systems. Preferably, such metal ions are selected from Ca, Mg, Al, Cu, Ni, Pb, Zn, Sb, Co, Cr, Cd, Hg, Zn, Fe and/or Ag. In particular, membranes M are useful for removing Hg, Cu, Zn, Ni and/or Fe ions from water.

In another preferred embodiment, membranes M are used in a water treatment step prior to the desalination of sea water or brackish water.

Membranes M can be used in medical applications like in dialysis and other blood treatments, food processing, concentration for making cheese, processing of proteins, desalting and solventexchange of proteins, fractionation of proteins, clarification of fruit juice, recovery of vaccines and antibiotics from fermentation broth, laboratory grade water purification, drinking water disinfection (including removal of viruses), removal of endocrines and pesticides combined with suspended activated carbon pretreatment.

Membranes M can be used for rehabilitation of mines, homogeneous catalyst recovery, desalting reaction processes.

EXAMPLES

Inge Multibore® Membrane 0.9: multichannel hollow fiber membrane made of polyethersulfone comprising seven channels with an inner diameter of each channel of 0.9 mm and an overall diameter of the multibore membrane of 4.0 mm and an average pore diameter in the rejection layer of 20 nm with the rejection layer being located on the lumen side.

Inge Multibore® Membrane 1.5: multichannel hollow fiber membrane made of polyethersulfone comprising seven channels with an inner diameter of each channel of 1.5 mm and an overall diameter of the multibore membrane of 6.0 mm and an average pore diameter in the rejection layer of 20 nm with the rejection layer being located on the lumen side.

Example 1-12: Inside-Out Coating of UF Membranes

The crosslinker trimesoylchloride (TMC) (0.025 wt %) in n-hexane solution was pumped from the lumen side of hollow fibers into the porous structure of a Inge Multibore® Membrane 0.9 for 3 min with the end of the module capped (see FIG. 1) to force the solution out into the porous structure. A purged sweeping air was applied for 2 min to remove the residual solvents/droplets in the same fashion. Hyper-branched polyethyleneimine (PEI) (2-4 wt %, molecular weight of 800-25,000 Da, see Table 1) aqueous solution in deionized water with molecular weights and weight percentage as given in Table 1 were then brought into contact with the TMC saturated surface on the membrane porous structure for 3 min with the module end capped to force the solution out into the porous structure. The excess PEI residual solutions or droplets were removed by purging a sweeping air for 6 min using a compressed air gun. The resultant coated membranes were then heat-cured at 65° C.

for 15 min. The membranes were subsequently stored in deionized water overnight before UF and ion rejection testing.

Example 13-16: Modified Inside-Out Coating of Active UF Membranes

Prior to coating, isopropanol was pumped through the membrane for 1 min, followed by n-hexane for 1 min. The crosslinker trimesoylchloride (0.025 wt %) in n-hexane solution was pumped from the lumen side of hollow fibers into the porous structure of the Inge Multibore® Membrane 0.9 for 3 min with the end of the module capped (see FIG. 1) to force the solution out into the porous structure. A purged sweeping air was applied for 2 min to remove the residual solvents/droplets in the same fashion. Hyperbranched polyethyleneimine (PEI) (2-4 wt %, molecular weight of 800-25,000 Da, see Table 1) aqueous solution in deionized water with molecular weights and weight percentage as given in Table 1 were then brought into contact with the TMC saturated surface on the membrane porous structure for 3 min with the module end capped to force the solution out into the porous structure. The excess PEI residual solutions or droplets were removed by purging a sweeping air for 6 min using a compressed air gun. The resultant coated membranes were then heat-cured at 65° C. for 15 min. The membranes were subsequently stored in deionized water overnight before UF and ion rejection testing.

Example 17-18: Glutaraldehyde-Crosslinked Coating of PEI

Inge Multibore® Membrane 1.5 were used in these examples. Polyethyleneimine (6 wt %, molecular weight of 800) aqueous solution in deionized water at 65° C. was pumped through the membrane porous structure for 5 min. Then, a purged sweeping air was applied for 6 min to push the residual solvents/droplets out from the lumen into the porous structure. Glutaraldehyde (a crosslinker) solution (0.5 wt %) in deionized water at 65° C. was then pumped through the membrane for 3 min. The membrane was then heat-cured at 65° C. for 15 min. After which, it was immersed in deionized water overnight until further UF and rejection tests using synthetic brackish water.

Testing of Membranes Prepared According to Examples 1 to 18

For performance test of coated membranes, deionized water was pumped through the fiber for 30 min with a trans-membrane pressure (TMP) of 0.4 bar and the pure water permeability (PWP) was taken. The water flux (Lm$^{-2}$ h$^{-1}$ bar$^{-1}$, abbreviated as LMH/bar) is calculated as follows: $J_v = \Delta V/(A \times \Delta t \times P)$, where V is the volume collected at a determined time (t) at a pressure of P and membrane surface area of A.

Polyethyleneglycol (PEG) solution (1000 ppm) with molecular weight 2,000, 3,000, 4,000, 6,000, 8,000, 10,000, 12,000, 20,000 and 100,000 was then pumped through the fiber for 15 min with TMP of 0.15 bar and the feed, permeate were collected for molecular weight cut-off (MWCO) determination. The relationship between Stokes radius ($r_s$, nm) and molecular weight (Mw, gmol$^{-1}$) of these neutral solutes can be expressed as:

$$\text{For PEG: } r = 16.73 \times 10^{-12} \times M^{0.557} \qquad (2)$$

The comparison of the coated membranes' performance against that of inge Multibore® 0.9 membrane's is given in table 2.

For ion rejection test of coated membranes for example 1-16, a solution containing metal/contaminant ion [Cu(NO$_3$)$_2$] (concentration of 2.5-20 ppm, pH range of 5-7) was pumped through the fiber for 1-14 h. Both feed and permeate solutions were analyzed for the reduction in copper (II) concentration over time using Inductively Coupled Plasma—Optical Emission Spectroscopy (ICP-OES) to calculate the metal ion rejection, $r = 100 \times (c_{feed} - c_{permeate})/c_{feed}$.

The short term results (up to 2 h) are given in tables 4-8, 12-15 while the long term results are given in table 9.

For synthetic brackish water rejection test for example 17-18, a solution containing Cu$^{2+}$ (concentration of 0.4-0.5 ppm), Na$^+$ (concentration of 547-551 ppm), Mg$^{2+}$ (concentration of 52-58 ppm) and Ca$^{2+}$ (concentration of 13-14 ppm) with pH adjusted to 7.0 was pumped through the fiber for 2-7 h. Both feed and permeate solutions were analyzed for the reduction in copper (II) concentration over time using Inductively Coupled Plasma—Optical Emission Spectroscopy (ICP-OES) to calculate the metal ion rejection, $r = 100 \times (c_{feed} - c_{permeate})/c_{feed}$.

The short term results (up to 2 h) are given in tables 16 while the long term results are given in table 17.

The ion solution permeability was also collected. Deionized water with pH adjustment to 2, followed by pure deionized water was then pumped through the fiber for a total of 15-30 min to regenerate the membrane. The second PWP was taken and the flux recovery was calculated from the ratio between the first and second PWP.

For regeneration studies, deionized water with pH adjustment to 2 was pumped through the fiber followed by a solution containing metal/contaminant ion [Cu(NO$_3$)$_2$] (concentration of 2.5-20 ppm, pH range of 5-7) to investigate the change in rejection after regeneration. The regeneration of coated multibore in example 11 and 12 are given in table 10-11.

TABLE 1

Performance and ion rejection of membranes coated according to examples 1 to 16

| | PEI | | Performance test | | | Ion rejection test | |
|---|---|---|---|---|---|---|---|
| | Molecular | | Pure water | | Ion solution | | |
| Ex. | weight/ Da | Weight/% | permeability/ LMH bar$^{-1}$ | MWCO/ Da | permeability/ LMH bar$^{-1}$ | Metal ion rejection/% | Flux recovery/% |
| 1 | 25 000 | 0.5 | 227.45 | — | — | 42.44 | 104.03 |
| 2 | 25 000 | 0.5 | 316.52 | — | — | 32.81 | 96.63 |
| 3 | 25 000 | 0.5 | 330.21 | 11, 476 | — | — | — |
| 4 | 25 000 | 0.5 | 193.79 | 10, 787 | — | — | — |

TABLE 1-continued

Performance and ion rejection of membranes coated according to examples 1 to 16

| | PEI | | Performance test | | | Ion rejection test | |
|---|---|---|---|---|---|---|---|
| | Molecular | | Pure water | | Ion solution | | |
| Ex. | weight/ Da | Weight/% | permeability/ LMH bar$^{-1}$ | MWCO/ Da | permeability/ LMH bar$^{-1}$ | Metal ion rejection/% | Flux recovery/% |
| 5 | 800 | 2.0 | 563.69 | — | — | 72.47 ± 1.48 | 99.63 |
| 6 | 800 | 2.0 | 643.69 | — | — | 82.06 ± 3.42 | 114.71 |
| 7 | 800 | 2.0 | 781.90 | 31, 815 | — | — | — |
| 8 | 800 | 2.0 | 686.47 | 63, 195 | — | — | — |
| 9 | 800 | 2.0 | 711.43 | — | 701.65 | 75.30 ± 1.19 | — |
| 10 | 800 | 2.0 | 655.2 | — | 368.35 | 76.13 ± 2.38 | 77.09* |
| 11 | 800 | 2.0 | 748.59 | — | — | 16.30 ± 0.41 | — |
| 12 | 800 | 2.0 | 765.7 | — | 691.87 | 15.28 ± 0.45 | — |
| 13 | 800 | 2.0 | 415.61 | — | 451.06 | 69.06 ± 2.48 | — |
| 14 | 800 | 2.0 | 325.97 | — | 375.52 | 66.86 ± 3.09 | — |
| 15 | 800 | 2.0 | 340.64 | — | 368.02 | Cu: 64.64 ± 3.4 Zn: 61.99 ± 0.7 | — |
| 16 | 800 | 2.0 | 432.24 | — | 467.69 | Cu: 67.88 ± 5.4 Zn: 64.08 ± 0.7 | — |

*After long-term ion rejection test of 14 h

TABLE 2

Comparison between inge multibore ® 0.9 membrane and inside-out method

| Code | PWP (LMH/bar) | MWCO (Da) |
|---|---|---|
| inge multibore ® 0.9 | 1405 | 171, 774 ± 6, 950 |
| Example 7 a* | 681 ± 79 | 47, 505 ± 15, 690 |

*With same coating procedure as Ex 7, but 0.5 wt % HPEI (Mw of 25 KDa), 0.025 wt % TMC

TABLE 3

| | PEI | | GA | Performance test | |
|---|---|---|---|---|---|
| Ex. | Molecular weight/ Da | Weight percentage/% | Weight percentage | Pure water permeability/ LMH bar$^{-1}$ | Ion solution permeability/ LMH bar$^{-1}$ |
| 17 | 800 | 6.0 | 0.5 | 125.17 | 118.72 |
| 18 | 800 | 6.0 | 0.5 | 247.80 | 236.90 |

TABLE 4

Short-term ion rejection test for Example 1

| Time/min | Cu$^{2+}$ Feed concentration/ ppm | Cu$^{2+}$ Permeate concentration/ ppm | Rejection/% |
|---|---|---|---|
| 0 | 23.8 | 0.58 | 97.56 |
| 2 | 23.8 | 8.60 | 63.87 |
| 4 | 23.8 | 12.50 | 47.48 |
| 6 | 23.8 | 13.70 | 42.44 |
| 8 | 23.8 | 13.70 | 42.44 |

TABLE 5

Short-term ion rejection test for Example 2

| Time/min | Cu$^{2+}$ Feed concentration/ ppm | Cu$^{2+}$ Permeate concentration/ ppm | Rejection/% |
|---|---|---|---|
| 0 | 19.2 | 0.03 | 99.84 |
| 2 | 19.2 | 3.9 | 79.69 |
| 4 | 19.2 | 10.7 | 44.27 |
| 6 | 19.2 | 12.9 | 32.81 |

TABLE 6

Short-term ion rejection test for Example 5

| Time/min | Cu$^{2+}$ Feed concentration/ ppm | Cu$^{2+}$ Permeate concentration/ ppm | Rejection/% |
|---|---|---|---|
| 0 | 2.5 | 0.24 | 90.40 |
| 5 | 2.5 | 0.55 | 78.00 |
| 10 | 2.5 | 0.63 | 74.80 |
| 15 | 2.5 | 0.64 | 74.40 |
| 20 | 2.5 | 0.68 | 72.80 |
| 25 | 2.5 | 0.69 | 72.40 |
| 30 | 2.5 | 0.69 | 72.40 |
| 35 | 2.5 | 0.68 | 72.80 |
| 40 | 2.5 | 0.72 | 71.20 |
| 45 | 2.5 | 0.75 | 70.00 |
| 50 | 2.5 | 0.74 | 70.40 |
| 55 | 2.5 | 0.68 | 72.80 |
| 60 | 2.5 | 0.67 | 73.20 |

TABLE 7

Short-term ion rejection test for Example 6

| Time/min | Cu$^{2+}$ Feed concentration/ ppm | Cu$^{2+}$ Permeate concentration/ ppm | Rejection/% |
|---|---|---|---|
| 0 | 2.7 | 0 | 100.00 |
| 2 | 2.7 | 0.29 | 89.26 |
| 4 | 2.7 | 0.39 | 85.56 |
| 6 | 2.7 | 0.38 | 85.93 |
| 8 | 2.7 | 0.29 | 89.26 |

TABLE 7-continued

Short-term ion rejection test for Example 6

| Time/min | $Cu^{2+}$ Feed concentration/ ppm | $Cu^{2+}$ Permeate concentration/ ppm | Rejection/% |
|---|---|---|---|
| 10 | 2.7 | 0.68 | 74.81 |
| 15 | 2.7 | 0.45 | 83.33 |
| 20 | 2.7 | 0.48 | 82.22 |
| 25 | 2.7 | 0.53 | 80.37 |
| 30 | 2.7 | 0.49 | 81.85 |
| 35 | 2.7 | 0.49 | 81.85 |
| 40 | 2.7 | 0.49 | 81.85 |
| 45 | 2.7 | 0.50 | 81.48 |
| 50 | 2.7 | 0.49 | 81.85 |
| 55 | 2.7 | 0.55 | 79.63 |
| 60 | 2.7 | 0.57 | 78.89 |

TABLE 8

Short-term ion rejection test for Example 9

| Time/min | $Cu^{2+}$ Feed concentration/ ppm | $Cu^{2+}$ Permeate concentration/ ppm | Rejection/% |
|---|---|---|---|
| 0 | 2.5 | 0.01 | 99.60 |
| 2 | 2.5 | 0.44 | 82.40 |
| 4 | 2.5 | 0.74 | 70.40 |
| 6 | 2.5 | 0.64 | 74.40 |
| 8 | 2.5 | 0.62 | 75.20 |
| 10 | 2.5 | 0.60 | 76.00 |
| 20 | 2.5 | 0.68 | 72.80 |
| 30 | 2.5 | 0.61 | 75.60 |
| 40 | 2.5 | 0.59 | 76.40 |
| 50 | 2.5 | 0.60 | 76.00 |
| 60 | 2.5 | 0.60 | 76.00 |

TABLE 9

Long-term ion rejection test for Example 10

| Time/min | $Cu^{2+}$ Feed concentration/ ppm | $Cu^{2+}$ Permeate concentration/ ppm | Rejection/% |
|---|---|---|---|
| 0 | 2.7 | 0.00 | 99.93 |
| 2 | 2.7 | 0.00 | 99.93 |
| 4 | 2.7 | 0.42 | 84.53 |
| 8 | 2.7 | 0.52 | 80.74 |
| 10 | 2.7 | 0.57 | 79.00 |
| 15 | 2.7 | 0.57 | 78.89 |
| 20 | 2.7 | 0.65 | 75.92 |
| 25 | 2.7 | 0.57 | 78.96 |
| 30 | 2.7 | 0.60 | 77.92 |
| 45 | 2.7 | 0.61 | 77.29 |
| 60 | 2.7 | 0.67 | 75.25 |
| 75 | 2.7 | 0.67 | 75.03 |
| 90 | 2.7 | 0.69 | 74.47 |
| 230 | 2.7 | 0.64 | 76.36 |
| 245 | 2.7 | 0.79 | 70.80 |
| 300 | 2.7 | 0.71 | 73.62 |
| 360 | 2.7 | 0.63 | 76.62 |
| 390 | 2.7 | 0.517 | 80.56 |
| 420 | 2.7 | 0.498 | 81.30 |
| 450 | 2.7 | 0.507 | 80.96 |
| 480 | 2.7 | 0.529 | 80.14 |
| 510 | 2.7 | 0.513 | 80.74 |
| 570 | 2.7 | 0.559 | 79.01 |
| 630 | 2.7 | 0.51 | 80.85 |
| 690 | 2.7 | 0.565 | 78.78 |
| 780 | 2.7 | 0.445 | 83.29 |
| 840 | 2.7 | 0.514 | 80.70 |

TABLE 10

Regeneration studies for Example 11

| Time/min | $Cu^{2+}$ Feed concentration/ ppm | $Cu^{2+}$ Permeate concentration/ ppm | Rejection/% |
|---|---|---|---|
| 0 | 18.18 | 9.68 | 46.76 |
| 2 | 18.18 | 15.79 | 13.16 |
| 4 | 18.18 | 16.18 | 10.99 |
| 6 | 18.18 | 16.19 | 10.96 |
| 8 | 18.18 | 15.58 | 14.32 |
| 10 | 18.18 | 16.25 | 10.63 |
| 15 | 18.18 | 16.48 | 9.37 |
| 20 | 18.18 | 16.24 | 10.69 |
| 40 | 18.18 | 16.97 | 6.64 |
| 41 | 18.18 | 9.69 | 46.73 |
| 42 | 18.18 | 14.71 | 19.08 |
| 44 | 18.18 | 14.34 | 21.14 |
| 46 | 18.18 | 14.73 | 18.97 |
| 48 | 18.18 | 14.59 | 19.76 |
| 50 | 18.18 | 14.82 | 18.50 |
| 60 | 18.18 | 14.30 | 21.33 |
| 80 | 18.18 | 14.90 | 18.06 |

TABLE 11

Regeneration studies for Example 12

| Time/min | $Cu^{2+}$ Feed concentration/ ppm | $Cu^{2+}$ Permeate concentration/ ppm | Rejection/% |
|---|---|---|---|
| 0 | 17.97 | 9.58 | 46.71 |
| 2 | 17.97 | 14.86 | 17.30 |
| 4 | 17.97 | 15.28 | 15.00 |
| 6 | 17.97 | 15.29 | 14.94 |
| 8 | 17.97 | 15.61 | 13.13 |
| 10 | 17.97 | 15.17 | 15.58 |
| 15 | 17.97 | 15.81 | 12.02 |
| 20 | 17.97 | 14.50 | 19.31 |
| 40 | 17.97 | 16.43 | 8.60 |
| 41 | 17.97 | 10.52 | 41.45 |
| 42 | 17.97 | 15.76 | 12.30 |
| 44 | 17.97 | 15.52 | 13.63 |
| 46 | 17.97 | 14.25 | 20.73 |
| 48 | 17.97 | 14.57 | 18.95 |
| 50 | 17.97 | 15.20 | 15.41 |
| 60 | 17.97 | 14.52 | 19.22 |
| 80 | 17.97 | 14.40 | 19.86 |

TABLE 12

Short-term ion rejection test for Example 13

| Time/min | $Cu^{2+}$ Feed concentration/ ppm | $Cu^{2+}$ Permeate concentration/ ppm | Rejection/% |
|---|---|---|---|
| 0 | 1.947 | 0.003 | 99.84 |
| 2 | 1.947 | 0.042 | 97.84 |
| 4 | 1.947 | 0.205 | 89.47 |
| 6 | 1.947 | 0.378 | 80.60 |
| 8 | 1.947 | 0.478 | 75.46 |
| 10 | 1.947 | 0.527 | 72.94 |
| 15 | 1.947 | 0.590 | 69.69 |
| 20 | 1.947 | 0.610 | 68.66 |
| 50 | 1.947 | 0.650 | 66.59 |
| 60 | 1.947 | 0.635 | 67.39 |

TABLE 13

Short-term ion rejection test for Example 14

| Time/min | $Cu^{2+}$ Feed concentration/ppm | $Cu^{2+}$ Permeate concentration/ppm | Rejection/% |
|---|---|---|---|
| 0 | 1.909 | 0.001 | 99.97 |
| 2 | 1.909 | 0.086 | 95.49 |
| 4 | 1.909 | 0.244 | 87.23 |
| 6 | 1.909 | 0.397 | 79.21 |
| 8 | 1.909 | 0.490 | 74.30 |
| 10 | 1.909 | 0.548 | 71.27 |
| 15 | 1.909 | 0.618 | 67.61 |
| 20 | 1.909 | 0.618 | 67.61 |
| 50 | 1.909 | 0.684 | 64.16 |
| 60 | 1.909 | 0.694 | 63.66 |

TABLE 14

Short-term copper (II), zinc (II) rejection for Example 15

| Time/min | $Cu^{2+}$ Feed concentration/ppm | $Cu^{2+}$ Permeate concentration/ppm | $Zn^{2+}$ Feed concentration/ppm | $Zn^{2+}$ Permeate concentration/ppm | $Cu^{2+}$ Rejection/% | $Zn^{2+}$ Rejection/% |
|---|---|---|---|---|---|---|
| 0 | 0.919 | 0.001 | 1.098 | 0.000 | 99.92 | 100.00 |
| 2 | 0.919 | 0.005 | 1.098 | 0.561 | 99.45 | 48.92 |
| 4 | 0.919 | 0.012 | 1.098 | 0.469 | 98.69 | 57.23 |
| 6 | 0.919 | 0.054 | 1.098 | 0.430 | 94.16 | 60.78 |
| 8 | 0.919 | 0.115 | 1.098 | 0.421 | 87.49 | 61.60 |
| 10 | 0.919 | 0.187 | 1.098 | 0.415 | 79.66 | 62.19 |
| 15 | 0.919 | 0.282 | 1.098 | 0.408 | 69.33 | 62.80 |
| 20 | 0.919 | 0.324 | 1.098 | 0.423 | 64.80 | 61.50 |
| 50 | 0.919 | 0.339 | 1.098 | 0.408 | 63.16 | 62.80 |
| 60 | 0.919 | 0.356 | 1.098 | 0.414 | 61.25 | 62.28 |

TABLE 15

Short-term copper (II), zinc (II) rejection for Example 16

| Time/min | $Cu^{2+}$ Feed concentration/ppm | $Cu^{2+}$ Permeate concentration/ppm | $Zn^{2+}$ Feed concentration/ppm | $Zn^{2+}$ Permeate concentration/ppm | $Cu^{2+}$ Rejection/% | $Zn^{2+}$ Rejection/% |
|---|---|---|---|---|---|---|
| 0 | 0.915 | 0.000 | 1.054 | 0.000 | 100.00 | 100.00 |
| 2 | 0.915 | 0.004 | 1.054 | 0.516 | 99.57 | 51.05 |
| 4 | 0.915 | 0.011 | 1.054 | 0.449 | 98.83 | 57.39 |
| 6 | 0.915 | 0.046 | 1.054 | 0.410 | 94.93 | 61.11 |
| 8 | 0.915 | 0.102 | 1.054 | 0.390 | 88.83 | 63.00 |
| 10 | 0.915 | 0.152 | 1.054 | 0.377 | 83.37 | 64.21 |
| 15 | 0.915 | 0.232 | 1.054 | 0.372 | 74.63 | 64.67 |
| 20 | 0.915 | 0.278 | 1.054 | 0.373 | 69.67 | 64.63 |
| 50 | 0.915 | 0.323 | 1.054 | 0.374 | 64.67 | 64.49 |
| 60 | 0.915 | 0.343 | 1.054 | 0.385 | 62.56 | 63.49 |

TABLE 16

Short-term copper (II) rejection for Example 17

| Time/min | $Cu^{2+}$ feed concentration/ppm | $Cu^{2+}$ permeate concentration/ppm | Rejection/% |
|---|---|---|---|
| 0 | 0.557 | 0.000 | 100.00 |
| 2 | 0.557 | 0.000 | 100.00 |
| 4 | 0.557 | 0.000 | 100.00 |
| 6 | 0.557 | 0.000 | 100.00 |
| 8 | 0.557 | 0.000 | 100.00 |
| 10 | 0.557 | 0.000 | 100.00 |
| 15 | 0.557 | 0.000 | 100.00 |
| 20 | 0.557 | 0.005 | 99.11 |
| 40 | 0.557 | 0.055 | 90.14 |
| 60 | 0.557 | 0.110 | 80.28 |
| 80 | 0.557 | 0.176 | 68.47 |
| 100 | 0.557 | 0.220 | 60.51 |
| 120 | 0.501 | 0.297 | 40.76 |
| 140 | 0.501 | 0.333 | 33.52 |
| 160 | 0.501 | 0.365 | 27.13 |
| 180 | 0.501 | 0.382 | 23.73 |
| 200 | 0.501 | 0.391 | 22.03 |
| 220 | 0.501 | 0.404 | 19.47 |

TABLE 17

Long-term copper (II) rejection for Example 18

| Time/min | $Cu^{2+}$ feed concentration/ppm | $Cu^{2+}$ permeate concentration/ppm | Rejection/% |
|---|---|---|---|
| 0 | 0.361 | 0.000 | 100.00 |
| 2 | 0.361 | 0.000 | 100.00 |
| 4 | 0.361 | 0.000 | 100.00 |
| 6 | 0.361 | 0.000 | 100.00 |
| 8 | 0.361 | 0.000 | 100.00 |
| 10 | 0.361 | 0.000 | 100.00 |
| 15 | 0.361 | 0.000 | 100.00 |
| 20 | 0.361 | 0.000 | 100.00 |
| 40 | 0.361 | 0.000 | 100.00 |
| 60 | 0.361 | 0.000 | 100.00 |
| 80 | 0.361 | 0.001 | 99.76 |
| 100 | 0.361 | 0.044 | 87.78 |
| 120 | 0.361 | 0.090 | 75.06 |
| 140 | 0.361 | 0.129 | 64.24 |
| 160 | 0.361 | 0.140 | 61.27 |
| 180 | 0.361 | 0.149 | 58.83 |
| 220 | 0.375 | 0.150 | 60.12 |
| 240 | 0.375 | 0.199 | 47.05 |
| 260 | 0.375 | 0.216 | 42.29 |
| 280 | 0.375 | 0.226 | 39.77 |
| 300 | 0.375 | 0.238 | 36.57 |
| 320 | 0.330 | 0.198 | 39.85 |
| 340 | 0.330 | 0.235 | 28.75 |
| 360 | 0.330 | 0.250 | 24.23 |
| 380 | 0.330 | 0.258 | 21.88 |
| 400 | 0.330 | 0.249 | 24.56 |
| 420 | 0.330 | 0.252 | 23.66 |

The invention claimed is:

1. A process for removing metal ions from an aqueous system, the process comprising treating the aqueous system with a membrane M, wherein the membrane M has a molecular weight cut-off above 3,000 Da and comprises
   A. a carrier membrane CM, wherein said carrier membrane CM has a porous structure wherein an average pore diameter on one surface is smaller than in the rest of the membrane, thus forming a rejection layer R on one side of carrier membrane CM, and
   B. an active layer A which is obtained from hyperbranched polyethyleneimine PEI crosslinked with a crosslinker V selected from the group consisting of trimesoyl chloride and glutaraldehyde; and wherein said active layer A is located on a surface of the rejection layer R of carrier membrane CM and throughout the porous structure of carrier membrane CM.

2. The process of claim 1, wherein said carrier membrane CM is a hollow fiber membrane comprising one or more channels with an inside with an inner surface and an outside with an outer surface and wherein said rejection layer R is formed on an inside or on an outside of carrier membrane CM.

3. The process of claim 1, wherein said rejection layer R is located on an inside of carrier membrane CM.

4. The process according to claim 1, wherein said rejection layer R is located on an outside of carrier membrane CM.

5. The process of claim 1, wherein said active layer A is obtained from hyper-branched polyethyleneimine PEI that was crosslinked with trimesoyl chloride.

6. The process of claim 5, wherein said hyper-branched polyethyleneimine PEI has an average molar mass MW of 500 to 1,000,000 Da.

7. The process of claim 1, wherein said carrier membrane CM is selected from ultrafiltration membranes and microfiltration membranes.

8. The process of claim 1, wherein said carrier membrane CM comprises as its main component at least one polymer selected from polysulfone, polyphenylenesulfone, polyethersulfone, and mixtures thereof.

9. The process of claim 1, wherein the aqueous system comprises industrial waste water, municipal waste water, sea water, brackish water, fluvial water, surface water, drinking water, mining water, waste water from an oil well and/or waste water from a power plant.

10. A membrane M as defined in claim 1.

11. A process for making a membrane M as defined in claim 1, the process comprising:
   a) Providing a carrier membrane CM wherein said carrier membrane CM is a hollow fiber membrane having one or more channels with an inside with an inner surface and an outside with an outer surface, wherein said carrier membrane CM has a porous structure wherein an average pore diameter on one surface is smaller than in the rest of the membrane, thus forming a rejection layer R on an inside or on an outside of carrier membrane CM,
   b) applying a solution S1 comprising at least one crosslinker selected from the group consisting of trimesoyl chloride and glutaraldehyde and at least one solvent SV to the surface of carrier membrane CM where the rejection layer R is located,
   c) Removing said at least one solvent SV at least partially from carrier membrane CM such that said at least one crosslinker remains at least partially on a surface and/or in the pore structure of carrier membrane CM,
   d) Applying a solution S2 comprising hyper-branched polyethyleneimine and at least one solvent SP to the surface of carrier membrane CM where the rejection layer R is located,
   e) Removing said at least one solvent SP from carrier membrane CM,
   f) Optionally curing active layer A at a temperature from 40 to 100° C.

12. The process of claim 11, wherein said at least one solvent SV is a hydrocarbon.

13. The process of claim 11, wherein solvent SP is selected from water and alcohols.

14. The process of claim 1 wherein the membrane M has a molecular weight cut-off above 7,000 Da.

15. The process of claim 14 wherein the aqueous system comprises ions of at least one metal selected from the group consisting of Hg, Cu, Zn, Ni and Fe.

* * * * *